(12) United States Patent
Henderson

(10) Patent No.: US 6,587,862 B1
(45) Date of Patent: Jul. 1, 2003

(54) APPARATUS AND METHOD FOR DIRECT DIGITAL FREQUENCY SYNTHESIS

(75) Inventor: David L. Henderson, Austin, TX (US)

(73) Assignee: Spectral Logic Design, Austin, TX (US)

( * ) Notice: Subject to any disclaimer, the term of this patent is extended or adjusted under 35 U.S.C. 154(b) by 0 days.

(21) Appl. No.: 09/390,900

(22) Filed: Sep. 7, 1999

(51) Int. Cl.$^7$ ................................................ G06F 1/02
(52) U.S. Cl. ...................................... 708/276; 708/271
(58) Field of Search ............................... 708/271, 272, 708/273, 270, 276, 440, 400

(56) References Cited

U.S. PATENT DOCUMENTS

| | | | | |
|---|---|---|---|---|
| 5,321,642 A | * | 6/1994 | Goldberg | 708/276 |
| 5,774,082 A | * | 6/1998 | Chu et al. | 341/117 |
| 5,999,581 A | * | 12/1999 | Bellaouar et al. | 375/377 |
| 6,333,649 B1 | * | 12/2001 | Dick et al. | 327/105 |

OTHER PUBLICATIONS

A 200 MHz Quadrature Digital Synthesizer/Mixer in 0.8$\mu$m CMOS, Loke Kun Tan and Henry Samueli, IEEE Journal of Solid State Circuits, vol. 30, No. 3, Mar. 1995.

* cited by examiner

Primary Examiner—Chuong Dinh Ngo
(74) Attorney, Agent, or Firm—Richard K. Huffman; James W. Huffman

(57) ABSTRACT

An apparatus and method are provided for synthesizing a variable frequency sinusoidal waveform. The apparatus and method exploit octant symmetry properties of sine and cosine waveforms, when taken together. The digital frequency synthesis apparatus includes a phase signal and a phase-to-amplitude converter. The phase signal indicates a desired phase angle of the sinusoidal waveform. The phase-to-amplitude converter is coupled to the phase signal. The phase-to-amplitude converter provides a desired amplitude sample corresponding to the desired phase angle, where the desired amplitude sample is derived from amplitude samples corresponding to an octant of the sinusoidal waveform. The phase-to-amplitude converter includes a Haar Transform-based coarse octant amplitude sample generator that computes Haar coefficients corresponding to the phase signal and transforms the Haar coefficients into the desired amplitude sample.

20 Claims, 8 Drawing Sheets

*Octant-based Direct Digital Frequency Synthesizer Featuring Simultaneous Quadrature Wave Generation*

FIG. 5
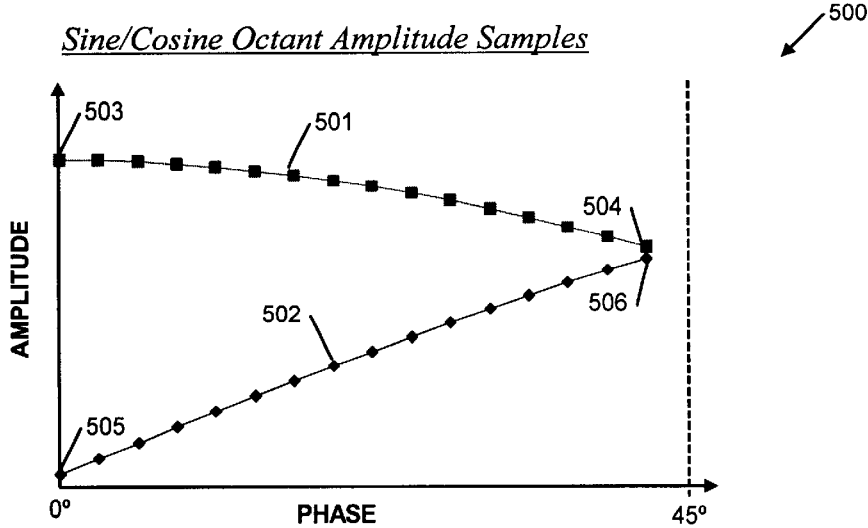
Sine/Cosine Octant Amplitude Samples
FIG. 6
Phase Accumulator Bit Assignments
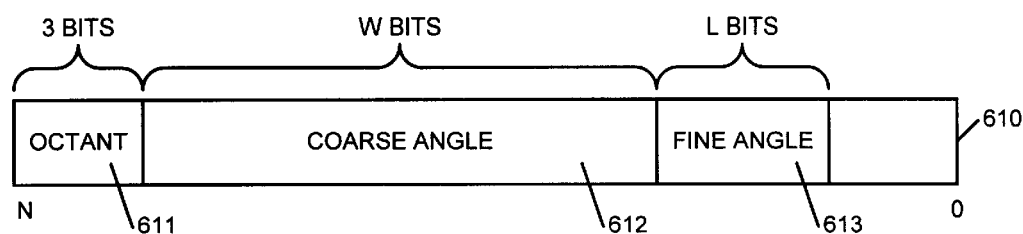
FIG. 7
Octant Symmetry Controller Outputs
| OCTANT | INVERT | NEGSIN | NEGCOS | SWAP |
|---|---|---|---|---|
| 0 | 0 | 0 | 0 | 0 |
| 1 | 1 | 0 | 0 | 1 |
| 2 | 0 | 0 | 1 | 1 |
| 3 | 1 | 0 | 1 | 0 |
| 4 | 0 | 1 | 1 | 0 |
| 5 | 1 | 1 | 1 | 1 |
| 6 | 0 | 1 | 0 | 1 |
| 7 | 1 | 1 | 0 | 0 |

*Octant-based Quadrature Synthesizer With First-order Taylor Series Interpolation*

APPARATUS AND METHOD FOR DIRECT DIGITAL FREQUENCY SYNTHESIS

CROSS-REFERENCE TO RELATED APPLICATIONS

This application is related to co-pending U.S. patent application Ser. No. 09/390,899 entitled "APPARATUS AND METHOD FOR COMPACT HAAR TRANSFORM", which is hereby incorporated by reference in its entirety for all purposes.

BACKGROUND OF THE INVENTION

1. Field of the Invention

This invention relates in general to the field of electronic circuit devices, and more particularly to an apparatus and method for digitally synthesizing variable frequency sinusoidal waveforms.

2. Description of the Related Art

In electronic systems, in particular those which are used in the communications field, the requirement to generate sinusoidal waveforms of varying frequency is very prevalent. Elementary physics tells us that the most effective and efficient means of transmitting information over long distances—regardless of whether the medium of transmission is wire, air, water, or some other substance—is to encode the information for transmission such that it is represented in the form of a sinusoid.

Virtually every electronic communications product on the market today employs multiple circuits whose only function is to generate a sinusoidal waveform at a prescribed frequency. Radios require such circuits so that they can receive a transmission over a specific channel. Telephones utilize specified frequency tones to indicate dialing sequences. And wireless products such as cellular telephones and pagers modulate voice signals for transmission over narrow and constantly changing frequency bands using sinusoidal modulation components. Spread-spectrum portable telephones utilize sinusoidal components to modulate voice at rapidly changing frequencies between a base station and a hand-held receiver. The list goes on and on.

In fact, certain products, specifically portable phones, cell phones, and pagers, could never have been developed using early apparatus to synthesize variable frequency sinusoidal waveforms. These early frequency synthesizers consisted entirely of analog electronic components that were heavy, complex, costly, and required lots of power to operate. Moreover, once set to a prescribed frequency, they typically had to be periodically reset because they tended to drift in frequency when operating temperature changed or as a function of operating time.

But all this changed with the introduction of digital frequency synthesis techniques. Because of the precision, speed, and low power requirement of digital logic devices, digital frequency synthesizers can be produced that are precise, small, inexpensive, and that can be operated in conjunction with other circuits for acceptable time periods on battery power alone. The proliferation of cell phones and pagers in our present culture attests to the enabling features of digital frequency synthesis techniques.

A present day digital frequency synthesizer consists of a phase signal generator and a phase-to-amplitude converter. The phase signal generator is loaded with a value that corresponds to a desired sinusoidal output frequency. Then, in synchronization with a clock signal, the phase signal generator produces digital data words at the frequency of the clock signal that correspond to phase samples ranging between 0 degrees and 360 degrees of the desired output signal. For example, at a clock signal rate of 100 MHz, if the phase signal generator produces phase samples that are 36 degrees apart (i.e., 0°, 36°, 72°, etc.), then this sequence corresponds to a 10 MHz output frequency.

This synthesized phase signal is then converted to an output amplitude by the phase-to-amplitude converter. Typically, a number of amplitude samples, each corresponding to a specific phase angle value for the output sinusoid are stored in a memory device such as a read-only memory (ROM) within the phase-to-amplitude converter. The phase signal is used to address a specific amplitude sample, which is then provided in digital form to an analog-to-digital converter. The analog to digital converter then produces a continuous amplitude waveform, changing the amplitude magnitude with each cycle of the clock signal.

From the above discussion, one skilled in the art can deduce that the generation of low-distortion sinusoids demands that a large number of amplitude samples be available for output within the ROM. Yet the storage of many samples requires many storage locations, proportionately increasing the cost, complexity, and power requirements of the digital frequency synthesizer. Fortunately, several techniques have been developed in more recent years that exploit the quadrature symmetry of sinusoidal waveforms so that storage location requirements are decreased by 75 percent. In addition, other compression techniques have been provided that allow even further reductions in power and size. One such technique utilizes Taylor Series expansion terms to improve the resolution of an amplitude sample corresponding to an intermediate phase angle, that is, an angle that is in between two angle values mapped by the ROM. But one skilled in the art will appreciate that for generation of a sine wave, to employ a meaningful Taylor series approximation, a term corresponding to a cosine wave must also be generated. Taylor series techniques are effective, but they require that both sine and cosine amplitudes be generated.

In spite of the advantages afforded by present day digital frequency synthesis techniques, application demands for mobile, portable, hand-held, and battery operated products continue to force designers to seek synthesizers that are less complex, that are more reliable, that are more precise, that use less power, and hence, that are less costly.

Therefore, what is needed is a digital frequency synthesizer that further exploits the symmetries inherent in sinusoidal waveforms to achieve further amplitude storage compression.

In addition, what is needed is an apparatus for simultaneously synthesizing sine and cosine wave components that only requires generation of amplitudes corresponding to an octant ranging in phase from 0 to 45 degrees for each of the components.

Furthermore what is needed is an octant-based digital frequency synthesizer for providing spectrally pure sine and cosine wave outputs.

Moreover, what is needed is a method for producing a sinusoidal waveform that uses only sine and cosine amplitude samples corresponding to an octant ranging from 0 degrees to 45 degrees in phase.

SUMMARY OF THE INVENTION

To address the above-detailed deficiencies, it is an object of the present invention to provide a digital frequency synthesizer that is based upon octant symmetries observed in a sine wave and cosine wave, taken together.

Accordingly, in the attainment of the aforementioned object, it is a feature of the present invention to provide a frequency synthesizer for producing a sinusoidal waveform. The frequency synthesizer includes a phase signal and a phase-to-amplitude converter. The phase signal indicates a desired phase angle of the sinusoidal waveform. The phase-to-amplitude converter is coupled to the phase signal. The phase-to-amplitude converter provides a desired amplitude sample corresponding to the desired phase angle, where the desired amplitude sample is derived from amplitude samples corresponding to an octant of the sinusoidal waveform The phase-to-amplitude converter includes a Haar Transform-based coarse octant amplitude sample generator that computes Haar coefficients corresponding to the phase signal and transforms the Haar coefficients into the desired amplitude sample.

An advantage of the present invention is that it requires less power to operate than that which has heretofore been provided.

Another object of the present invention is to provide an apparatus for simultaneously synthesizing sine and cosine wave components that translates of sine and cosine amplitudes corresponding an octant ranging in phase from 0 to 45 degrees to an octant corresponding to a desired phase angle.

In another aspect, it is a feature of the present invention to provide a digital frequency synthesizer for simultaneously producing a sine wave and a cosine wave, the sine wave and the cosine wave being at a prescribed frequency. The digital frequency synthesizer has an amplitude sample generator, a symmetry controller, and interpolation logic. The amplitude sample generator computes Haar coefficients corresponding to a desired phase angle, and transforms the Haar coefficients into a particular in-phase amplitude sample and a particular quadrature amplitude sample. The amplitude sample generator also generates amplitude samples that lie within a first phase octant ranging from 0 degrees to 45 degrees. The amplitude sample generator has in-phase amplitude samples, for indicating sine wave amplitudes within the first phase octant, and quadrature amplitude samples, for indicating cosine wave amplitudes within the first phase octant. The symmetry controller is coupled to the amplitude sample generator. The symmetry controller receives a phase signal from a phase accumulator. The phase signal indicates the desired phase angle. The symmetry controller selects the particular in-phase amplitude sample and the particular quadrature amplitude sample to provide a desired sine wave amplitude and a desired cosine wave amplitude at the desired phase angle. The interpolation logic is coupled to the symmetry controller. The interpolation logic adds a first first-order Taylor series term to the particular in-phase amplitude sample, thereby increasing precision of the sine wave. The interpolation logic includes a multiplier that multiplies fine phase bits of the phase signal by a 90 degree term to account for digital scaling difference between amplitude magnitude representations and phase magnitude representations within the frequency synthesizer.

Another advantage of the present invention is that the present invention possesses the inherent capacity to support more advanced quadrature modulation schemes.

A further object of the present invention is to provide an octant-based digital frequency synthesizer for providing spectrally pure sine and cosine wave outputs.

In a further aspect, it is a feature of the present invention to provide a computer program product for use in designing, simulating, fabricating, or testing a direct digital frequency synthesizer circuit. The computer program product includes a storage medium that has computer readable instructions embodied thereon, for causing a computer upon which the computer readable instructions are executed to describe the digital frequency synthesizer circuit such that it can be modified, simulated, fabricated, or tested. The computer readable instructions include first instructions and second instructions. The first instructions cause the computer to describe a phase signal, for indicating a desired phase angle of a sinusoidal waveform. The second instructions cause the computer to describe a phase-to-amplitude converter, coupled to the phase signal, for providing a desired amplitude sample corresponding to the desired phase angle, where the desired amplitude sample is derived from amplitude samples corresponding to an octant of the sinusoidal waveform. The phase-to-amplitude converter has a Haar Transform-based coarse octant amplitude sample generator that computes Haar coefficients corresponding to the phase signal, and that transforms the Haar coefficients into the desired amplitude sample.

A further advantage of the present invention is that it allows battery operated products to operate longer.

Yet another object of the present invention is to provide a method for producing a sinusoidal waveform that uses only amplitude samples corresponding to an octant ranging from 0 degrees to 45 degrees in phase.

In yet another aspect, it is a feature of the present invention is to provide a method for generating a sine wave and a cosine wave at a prescribed frequency by direct digital frequency synthesis. The method includes providing a phase angle signal, wherein the rate of change of the phase angle signal corresponds to the prescribed frequency; generating Haar coefficients that correspond to a first octant of the sine wave and the cosine wave; selecting specific Haar coefficients that correspond to a specific phase offset within the first octant, wherein a desired phase angle for the sine wave and the cosine wave is determined by summing a true octant base angle with the specific phase offset; and translating the specific Haar coefficients into a cosine amplitude sample and a sine amplitude sample that correspond to the desired phase angle.

Yet another advantage of the present invention is that Taylor Series techniques can easily be employed to reduce output distortion because the generation of sample components required for Taylor Series terms are provided for within an octant-based amplitude sample generator.

BRIEF DESCRIPTION OF THE DRAWINGS

These and other objects, features, and advantages of the present invention will become better understood with regard to the following description, and accompanying drawings where:

FIG. 5 is a diagram illustrating sine and cosine waveform octant amplitude samples as generated by the present invention.

FIG. 6 is a diagram depicting bit assignments within a phase accumulator according to the present invention.

FIG. 7 is a table depicting output states of an octant symmetry controller according to the present invention.

DETAILED DESCRIPTION

In view of the above background on present day techniques for digitally synthesizing variable frequency waveforms, examples will now be discussed with reference to FIGS. 1 and 2. These examples illustrate the limitations of present day direct digital frequency synthesizers, particularly when these synthesizers are employed in mobile or portable products that rely upon batteries for power. Following this discussion, a detailed description of the present invention will be provided with reference to FIGS. 3 through 11. The present invention provides a direct digital frequency synthesis apparatus that is smaller, less complex, more reliable, and requires less power to operate than what has heretofore been achievable.

Figure 1:
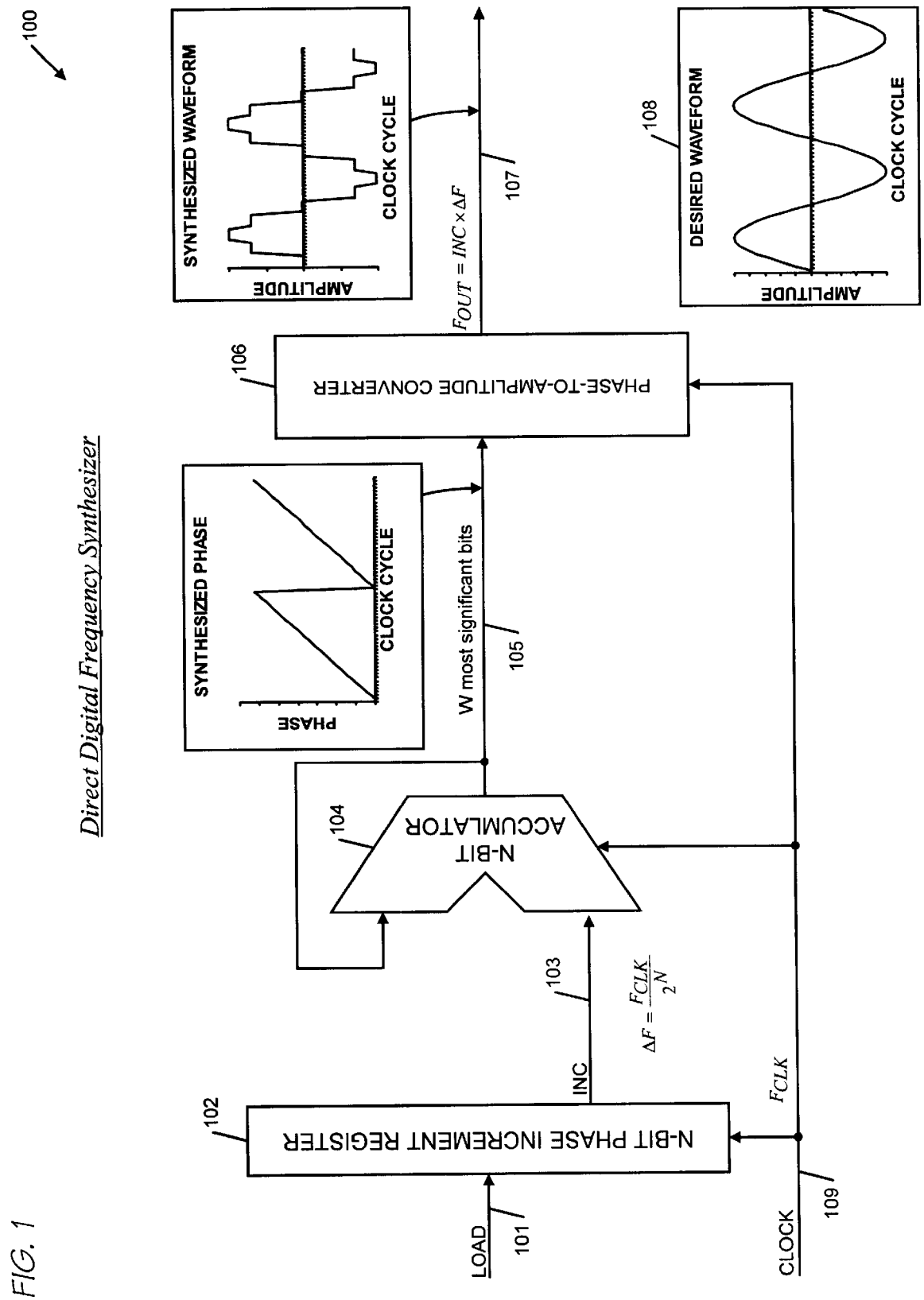
FIG. 1 is a block diagram illustrating a present day direct digital frequency synthesizer.

Referring to FIG. 1, a block diagram is presented illustrating a present day direct digital frequency synthesizer 100. The digital frequency synthesizer 100 has a phase increment register 102 that outputs a phase increment signal 103, INC, to a phase accumulator 104. The phase accumulator 104, capable of accumulating N-bit digital data elements, outputs a phase signal 105 to a phase-to-amplitude converter 106. In addition, the phase signal 105 is fed back into one input of the phase accumulator 104. The phase-to-amplitude converter 106 outputs a synthesized waveform 107, in this case a sine wave 107, at output frequency $F_{OUT}$. The phase increment register 101, phase accumulator 104, and phase-to-amplitude converter 106 generate their respective outputs 103, 105, 107 in synchronization with a clock signal 108, CLOCK. The contents of the phase increment register 102 are provided from other circuitry (not shown) via a load signal 101, LOAD.

In operation, the digital frequency synthesizer circuit 100 generates a variable frequency waveform, such as the sine wave 107 shown in FIG. 1. The number of application areas for digital frequency synthesis is myriad, but one most commonly finds such circuits 100 in the communications area where variable frequency sinusoidal waveforms are utilized to modulate information signals for transmission, to demodulate transmitted signals for reception, or to translate signals in frequency. And although digital frequency synthesizers 100 are employed to generate many other different periodic waveform types, they are used more frequently to generate sinusoidal waveforms. Sinusoidal waveforms, that is, sine and cosine waves, are the fundamental components of virtually every present day modulation technique, to include amplitude modulation (AM), frequency modulation (FM), frequency shift keying (FSK), phase modulation (PM), phase shift-keying (PSK), quadrature amplitude modulation (QAM), quadrature amplitude shift keying (QASK), and quadrature phase shift keying (QPSK). All present day cellular telephones and related devices employ variants of the QPSK modulation scheme.

Digital frequency synthesis techniques have enabled many product technology areas to move forward, because digital circuits have faster switching times, lower power consumption, and are more stable and precise over a wide range of operating conditions than their analog counterparts. Because of their fast switching times, digital synthesizers have permitted communication circuit designers to make use of the more complex quadrature modulation schemes. Quadrature modulation schemes require generation of both an in-phase component (i.e., a sine wave at a prescribed frequency) and a quadrature component (i.e., a cosine wave at precisely the same prescribed frequency) to accomplish modulation whereas simple modulation schemes such as FSK and PSK only require generation of a single in-phase waveform. Quadrature modulation schemes are very powerful in that more information can be transmitted during a given interval with less error as compared to the less complex modulation schemes. An in-depth discussion of the various modulation techniques and their requirements, benefits, and limitations is beyond the scope of this application. It is sufficient, however, to note that present day cellular telephone, pager, and related wireless products would not even be feasible were it not for the enabling advantages resulting from direct digital frequency synthesis.

FIG. 1 depicts a representative present day digital frequency synthesizer circuit 100. A microprocessor (not shown) or some other type of controller establishes a prescribed frequency for the output sinusoidal waveform 107 by loading a prescribed increment value into the phase increment register 102. The phase increment register 102 provides this value on its output 103, INC, so that it is summed with the phase accumulator output 105 in synchronization with the clock signal 109, CLOCK. Thus, the phase accumulator 104 produces a linearly increasing phase angle indication at the prescribed frequency, $F_{OUT}$, on the phase signal output 105. A full 360-degree cycle of a periodic waveform is initiated each time the phase accumulator 104 overflows. Obviously, the frequency of the clock signal 109 establishes the upper limit for $F_{OUT}$. One skilled in the art will additionally appreciate that the upper limit for $F_{OUT}$ is constrained to be less than $F_{CLK}/2$ due to Shannon's Sampling Theorem. In practice, $F_{OUT}$ typically does not exceed 45 percent of $F_{CLK}$.

The resolution of the output waveform 107 is determined by the width in bits of the phase accumulator 104. For example, suppose that $F_{CLK}$ is 100 MHz. If the accumulator 104 is eight bits wide, then the achievable output frequency resolution, $\Delta F$, is computed as, $\Delta F = F_{CLK}/2^N = 100 \times 10^6/2^8 = 390,625$ Hz; not extremely fine resolution, but perhaps useful in some applications. Yet if the accumulator 104 is 32 bits wide, then output frequency can be varied at increments less than 1 Hz. $F_{OUT}$ instance, to produce a 25 kHz output 107 using a 32-bit phase accumulator 104 requires that the phase increment register 102 be loaded with an increment value of 0010624Dh. Increasing the width of the phase accumulator 104 increases the resolution achievable in output frequency. Thus, the frequency of the output signal 107 is prescribed by loading a data entity into the phase increment register 102.

Translation of the phase signal 105 for a periodic waveform to a waveform output 107 is accomplished by the phase-to-amplitude converter 106. The phase-to-amplitude converter 106 directly maps each discrete value of phase that is presented via the phase signal 105 to a corresponding output amplitude. In the case that the output waveform 107 is a sine wave, then the phase-to-amplitude converter 106 maps a zero amplitude for phase signal values corresponding to 0 degrees and 180 degrees in phase. Likewise, a positive full-scale amplitude is provided for a phase signal 105 indicating 90 degrees and a negative full-scale amplitude is output for a 270 degree phase signal 105. And for intermediate phase angles, corresponding quantized sine wave amplitudes are output by the converter 106. Because of this one-to-one relationship between phase angle and output amplitude, it follows then that $2^{32}$ mappings are required to uniquely map phase to amplitude for a 32-bit phase signal 105-a capability that cannot be practically realized for many applications.

Nevertheless, fine frequency resolution can be retained as a capability in a product at the expense of distortion in the output signal 107. This is accomplished by truncating lower bits of the phase signal 105 and presenting only the upper W most significant bits to the phase-to-amplitude conversion logic 106. Consequently, the phase-to-amplitude converter 106 need only map $2^W$ phase values to corresponding amplitudes as opposed to mapping $2^N$ phase values. What this means is that the same quantized amplitude is output by the converter 106 for all phase angles generated by the phase accumulator 104 that do not change the states of any of the W most significant bits of the phase signal 105. Distortion notwithstanding, the practice of phase signal truncation has enabled phase-to-amplitude converters 106 to be produced that are smaller, less complex, less expensive, and that require less power, making these kinds of devices ideally suited for mobile and portable products. Less power is required because less amplitudes need be stored in the converter.

But one skilled in the art will concur that for any realistic product application, the desired output waveform 108 of a phase-to-amplitude converter 106 clearly should be a pure sine wave, or at least one with spurious frequency components whose magnitudes are sufficiently below that of the fundamental frequency of the sinusoid. Yet, as alluded to above, decreasing the number of phase-to-amplitude mappings actually increases the distortion present in the output waveform 107. Consequently, product designers are forced to accept some amount of distortion in the output signal 107 in order to realize products that satisfy product size, power, and cost constraints. Accordingly, the structure and capabilities of phase-to-amplitude converters 106 continue to be a primary focus in the mobile, hand-held, and portable product arenas, the fundamental thrust being increasing the spectral purity of the output waveform 107 without increasing complexity, size, cost, or power consumption. This issue is more specifically discussed with reference to FIG. 2.

Figure 2:
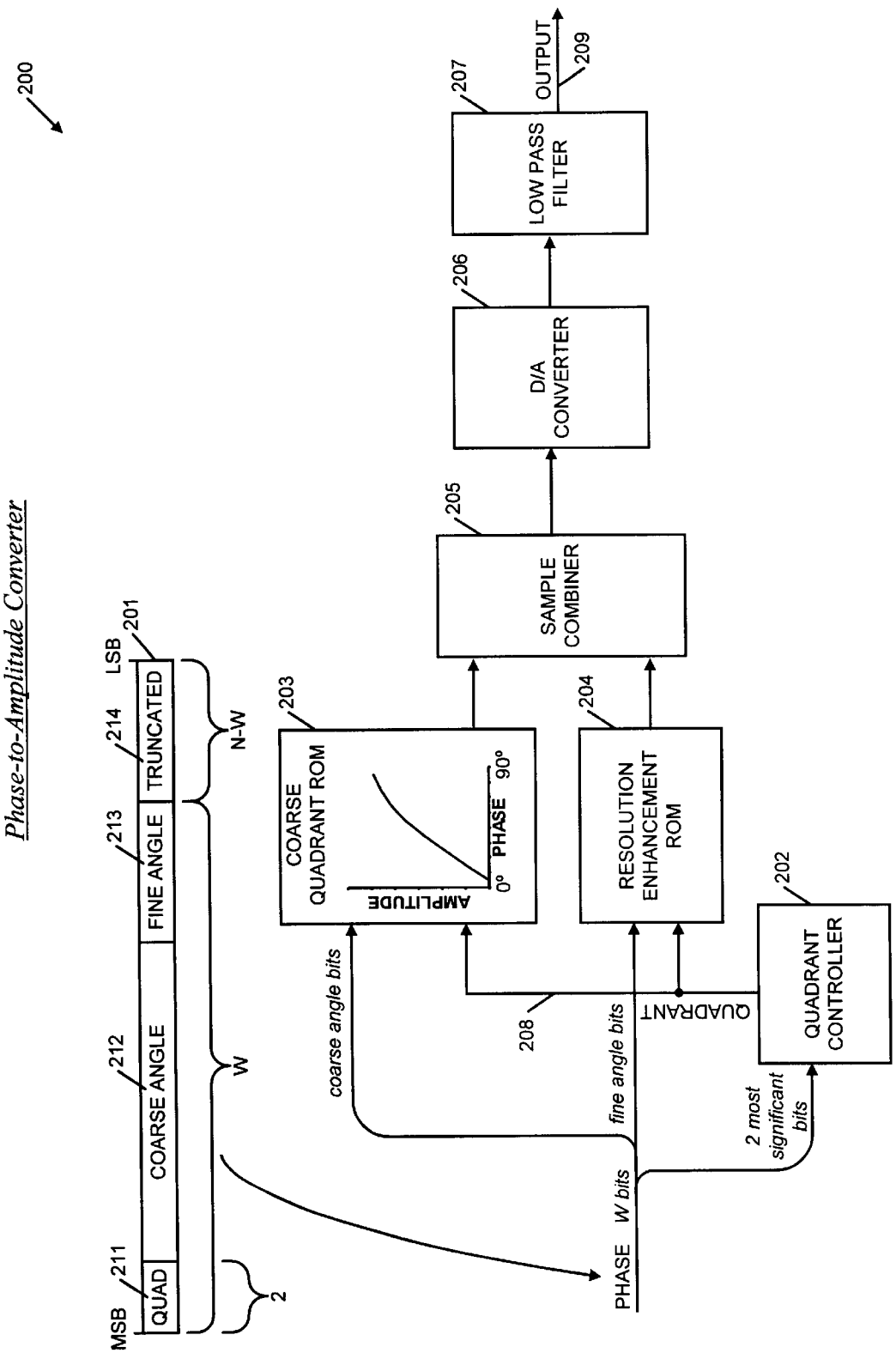
FIG. 2 is a block diagram of a present day quadrant-based phase-to-amplitude conversion circuit within the direct digital frequency synthesizer of FIG. 1.

Referring to FIG. 2, a block diagram is presented illustrating a present day quadrant-based phase-to-amplitude conversion circuit 200 within the direct digital frequency synthesizer 100 of FIG. 1. The phase-to-amplitude converter 200 includes a quadrant controller 202, a coarse quadrant read-only memory (ROM) 203, and a resolution enhancement ROM 204, all of which receive portions of a phase signal 201 from a phase accumulator (not shown). Outputs of the coarse quadrant ROM 203 and the resolution enhancement ROM 204 are provided to a sample combiner 205. The sample combiner 205 provides an output to a digital-to-analog (D/A) converter 206 and the output of the D/A converter 206 is provided to a low pass filter 207. A filtered sine waveform of prescribed frequency is provided on output 209. The phase signal 201 has a quadrant field 211, consisting of the two most significant bits of the signal 201.

The quadrant field 211 is provided to the quadrant controller 202. A coarse angle field 212 comprises the next most significant bits of the signal 201. The coarse angle bits 212 are provided to the coarse quadrant ROM 203. A group of lower-order significant bits make up a fine angle field 213, which is provided to the resolution enhancement ROM 204. And finally, the least significant bits of the signal 201 comprise a truncated field 214. The bits comprising the truncated field 214 are truncated, that is, they are not supplied to any element within the phase-to-amplitude converter 200. The overall size of the phase signal 201, the number of bits that are truncated, and the sizes of the coarse angle and fine angle fields 212, 213 differ according to product type and application within which the phase-to-amplitude converter is employed.

Operationally, the coarse quadrant ROM 203 stores amplitude samples for a sine wave only for its first quadrant, that is, amplitude samples corresponding to phase angles between 0 degrees and 90 degrees. This is because designers in more recent years have noted that sinusoidal waveforms possess symmetry properties about phase quadrant axes. More specifically, the amplitude of a sine wave within a second quadrant ranging from 90 degrees to 180 degrees is a mirror image of its amplitude in the first quadrant. The same symmetry properties apply to an axes dividing the third and fourth phase quadrants. Furthermore, the amplitude of the sine wave in its third and fourth phase quadrant is, the negative of its amplitude in its first and second quadrant. Thus, the coarse quadrant ROM 203 need only generate amplitude samples that correspond to the first quadrant of the waveform; with knowledge of which phase quadrant the phase signal 201 is truly indicating, a particular amplitude sample generated by the coarse quadrant ROM 203 can easily be translated into a true amplitude sample that corresponds to a true phase angle.

Translation of the amplitude samples so that they correspond to a true quadrant is the function of the quadrant controller 202. Typically, the two most significant bits 211 of the phase signal 201 are provided to the quadrant controller, the coarse angle bits 212 are supplied to the coarse quadrant ROM 203, and the fine angle bits 213 are provided to the and resolution enhancement ROM 204. The most significant bit of the quadrant field 211 indicates which half of the waveform cycle that the phase signal 201 indicates. If the most significant bit is asserted, then the coarse angle indicated by the coarse angle bits 212 represent an angle in the second half of the waveform cycle and hence, it is necessary to negate the amplitudes generated by the coarse quadrant ROM 203. Similarly, the next most significant bit in the quadrant field 211 indicates whether the coarse angle is within the first/third quadrants or the second/fourth quadrant. For phase angles lying within the second and fourth quadrants, it is necessary to generate a reflected amplitude sample, that is, an amplitude sample that corresponds to an angle in the first quadrant as reflected about an axis at 90 degrees. For OUT example, assuming that the coarse ROM 203 resolution is 1 degree, then an amplitude sample corresponding to a true phase angle of 91 degrees would require that the coarse ROM 203 generate an amplitude sample corresponding to an 89-degree offset into the first octant. Likewise, an amplitude sample corresponding to a true phase angle of 105 degrees would require that the coarse ROM 203 generate an amplitude sample corresponding to a 60-degree offset into the first octant. Similarly, an amplitude sample corresponding to a true phase angle of 271 degrees would require that the coarse ROM 203 generate an amplitude sample corresponding to an 89-degree offset into the first octant, but with the added step that the amplitude sample be negated to account for its being in the second half of the waveform cycle.

The quadrant controller provides for negation and translation of amplitude samples in both the coarse ROM 203 add the resolution enhancement ROM 204 via a quadrant signal 208, QUADRANT. Typically, when the phase signal 201 indicates that a phase angle is in the second or fourth quadrant, the quadrant signal 208 directs the coarse quadrant ROM 203 and the resolution enhancement ROM 204 to invert their respective coarse angle bits 212 and fine angle bits 213, thus addressing reflected angle locations for the retrieval of amplitude samples. Clearly, having to store amplitude samples for only one quadrant of a sine wave cuts the number of sample storage locations that would otherwise be required in the coarse ROM 203 by 75 percent. This storage compression technique has been very popular for it allows phase-to-amplitude converters 200 to be produced that are simpler and that use less power.

In addition to quadrant storage techniques, digital frequency synthesizer designers are continuing to develop storage compression techniques. One prevalent set of compression techniques is known as trigonometric techniques and the other prevalent set is known as Taylor Series techniques. Both of these sets of techniques involve the use of at least one additional set of stored amplitudes. The resolution enhancement ROM 204 in FIG. 2 is provided to depict circuitry required to implement either the trigonometric techniques or the Taylor Series techniques.

The most prevalent trigonometric technique that is employed by present day digital frequency synthesizers for ROM compression utilizes the sum of angles formula:

$$\sin(a+b) = \sin(a)\cos(b) + \cos(a)\sin(b).$$

Trigonometric ROM compression is implemented by storing sine wave amplitudes corresponding to coarse angles in the coarse quadrant ROM 203 and storing sine amplitudes corresponding to fine angles in the resolution enhancement ROM 204. Phase shift circuitry (not detailed) is also required to effect a 90-degree phase shift on amplitude samples taken from both the coarse ROM 203 and the resolution enhancement ROM 204 to form the cosine wave amplitudes required by the sum of angles formula above. In essence, the coarse quadrant ROM 203 supplies samples corresponding to, say, 9 bits of coarse angle, and the resolution enhancement ROM 204 supplies amplitude samples corresponding to, say, three bits of fine angle. Thus, 12-bit resolution (i.e., the equivalent of 4,096 amplitude locations) is achieved by combining a 9-bit circuit 203 (512 locations) and a 3-bit circuit 204 (8 locations). For trigonometric compression, the sample combiner 205 executes the sum of angles function on the provided amplitude samples to produce a more precise amplitude sample corresponding to the indicated phase angle.

Taylor's Theorem states that any continuous function, f(x), having N+1 continuous derivatives about a point, a, can be approximated about a by an n-degree polynomial:

$$f(x) = \sum_{k=0}^{n} \frac{f^{(k)}(a)}{k!}(x-a)^k =$$

$$f(a) + f'(a)(x-a) + \frac{f''(a)}{2!}(x-a)^2 + \cdots + \frac{f^{(n)}(a)}{n!}(x-a)^n.$$

Applying Taylor's Theorem to the approximation of a sinusoidal amplitude of a point that is a small angle, d, removed from a larger coarse angle, $x_0$, leads to the expression:

$$\sin(x_0 + \delta) = \sum_{k=0}^{n} \frac{\sin^{(k)}(x_0)}{k!}(\delta)^k =$$

$$\sin(x_0) + \cos(x_0)(\delta) - \frac{\sin(x_0)}{2!}(\delta)^2 + \cdots + \frac{\sin^{(n)}(x_0)}{n!}(\delta)^n.$$

Typically, to implement Taylor Series compression techniques, either the quadrant controller 202 contains phase shift capability or an additional set of cosine amplitude samples is provided in the coarse quadrant ROM 203, thus doubling the number of required storage cells in the coarse ROM 203. The resolution enhancement ROM 204 is not required to implement Taylor Series techniques because the fine angle bits 213 are provided to the sample combiner 205. The sample combiner 205 performs the arithmetic operations according to the number of Taylor Series terms, n, that are required to provide specified resolution. Typically, only one or two Taylor series terms are required to acceptably reduce distortion in an output waveform 209.

Regardless of which storage compression technique is employed, the sample combiner 205 outputs a more precise amplitude sample for a sine wave corresponding to the phase angle indicated by the phase signal 201. The amplitude sample, a digital data entity, is converted to an analog waveform by the D/A converter 206. The low pass filter 207 is required to remove spectral components resulting from the aliasing effects present in sampled data systems.

Although the exploitation of quadrant symmetry in sinusoidal waveforms and the use of storage compression techniques has allowed the production of smaller digital frequency synthesizer circuits that require less power, the need for size, cost, and power consumption improvements in the art remains. Particularly with regard to hand-held, battery-powered communication devices, such improvements will lead to longer operating time and higher reliability.

The present inventor has observed that the symmetry of sine and cosine waveforms, taken together, can be exploited beyond the quadrant symmetry techniques that are presently used in digital frequency synthesizer products. These observations are more specifically described with reference to FIG. 3.

Figure 3:
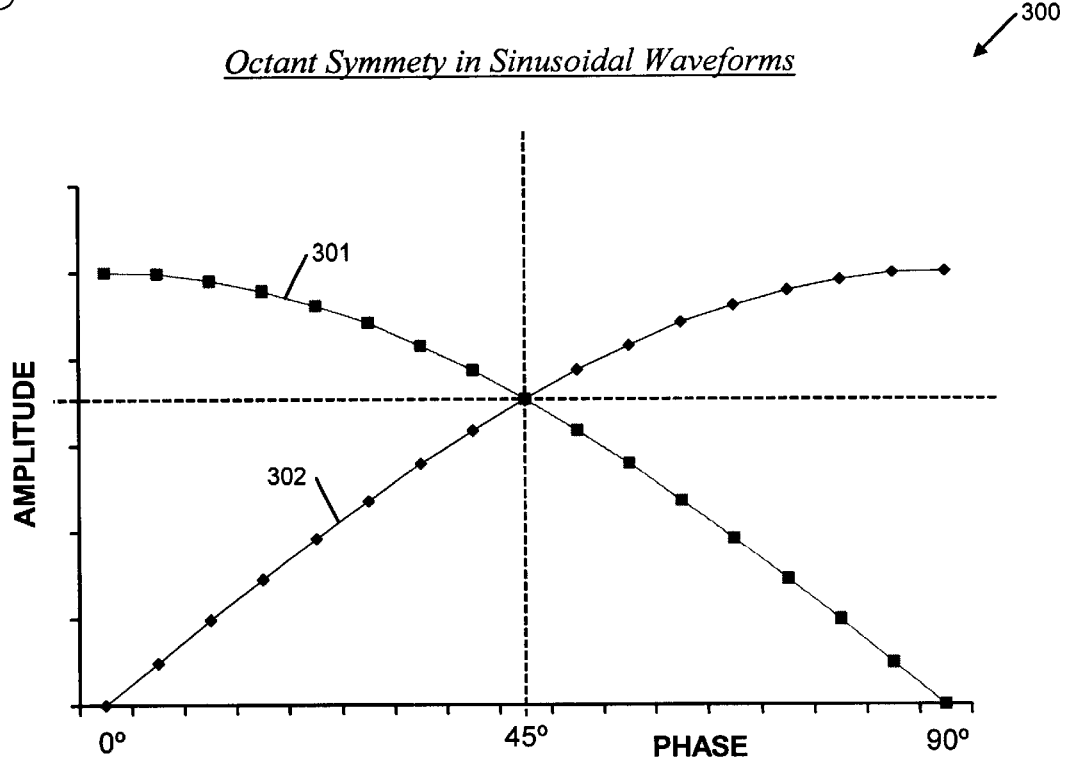
FIG. 3 is a diagram illustrating phase octant symmetries of sine and cosine waveforms according to the present invention.

FIG. 3 is a diagram 300 diagram illustrating phase octant symmetries of sine and cosine waveforms according to the present invention. The diagram 300 shows a first quadrant of a cosine waveform 301 overlapping a first quadrant of a sine waveform 302. Amplitude samples for each of the waveforms are depicted with respect to an offset phase angle within the first quadrant.

By establishing an axis at 45 degrees in phase, octant symmetry properties of each of the waveforms 301, 302 become immediately apparent. The first octant of the cosine wave 301 is a reflection of the second octant of the sine wave 302 about the 45-degree axis. In addition, the first octant of the sine wave 302 is a reflection of the second octant of the cosine wave 301 about the 45-degree axis. Hence, all the information that is truly required to generate a full cycle of a sinusoidal waveform, either a sine wave or a cosine wave, is contained within sine and cosine amplitude samples corresponding to the first octant.

The present invention exploits the octant symmetry properties of sinusoidal waveforms to achieve storage compression, simultaneous in-phase and quadrature waveform generation, and to improve the spectral purity of output waveforms via Taylor Series techniques. The present invention is described with reference to FIGS. 4 through 11.

Figure 4:
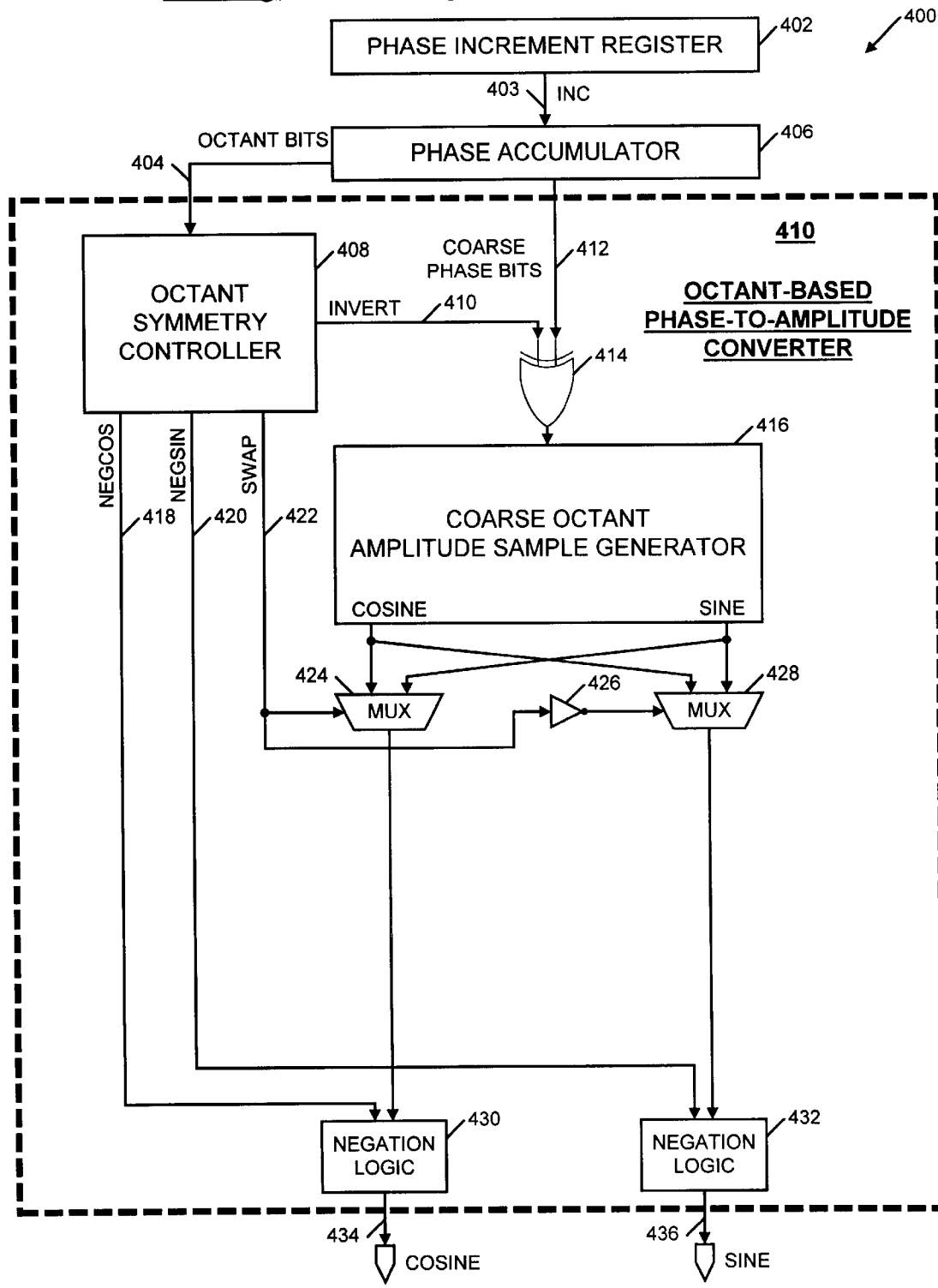
FIG. 4 is a block diagram illustrating an octant-based direct digital frequency synthesizer according to the present invention.

Now referring to FIG. 4, a block diagram is presented illustrating an octant-based direct digital frequency synthesizer 400 according to the present invention. The octant-based direct digital frequency synthesizer 400 includes a phase increment register 402 that provides a phase increment signal 403, INC, to a phase accumulator 406. Outputs of the phase accumulator 406 are provided to an octant-based phase-to-amplitude converter 410. The phase accumulator 406 generates a phase signal (not shown) in the same manner as described with reference to FIG. 1. The three most significant bits of the phase signal are supplied to an octant symmetry controller 408 within the octant-based phase-to-amplitude converter 410 via an octant signal 404, OCTANT BITS. The next most significant bits of the phase signal are supplied to multi-bit XOR gate 414 via a signal 412, COARSE PHASE BITS. The output of XOR gate 414 is provided to a coarse octant amplitude sample generator 416. The coarse octant amplitude sample generator 416 has two outputs: a cosine output and a sine output. The cosine output is provided to mux 424 and the sine output is provided to mux 428. Outputs of the muxes 424, 428 are supplied respectively to negation logic 430, 432. Negation logic 430 provides a cosine amplitude output 434 and negation logic 432 provides a sine amplitude output 436. The outputs 434, 436 are provided in parallel.

Operationally, the phase increment register 402 and phase accumulator 406 operate similar to the like-named elements 102, 104 discussed with reference to FIG. 1. The phase accumulator 406 thus generates a linearly increasing and periodic phase angle signal for a prescribed frequency that is established by the contents of the phase increment register 402. Although not shown in FIG. 4, a clock signal is employed to synchronously drive the elements of the digital frequency synthesizer 400. COARSE PHASE BITS 412 indicate an offset phase angle into a first octant of a sinusoidal waveform and OCTANT BITS 404 indicate a true octant corresponding to the COARSE PHASE BITS 412. OCTANT BITS 404 are utilized by the octant symmetry controller 408 to translate amplitude samples taken from the sample generator 416 so that they correspond to the true octant rather than the first octant.

As discussed with reference to FIG. 3, all that is needed to reproduce either a sine or a cosine wave are amplitude samples that correspond to a first octant of both a sine wave and a cosine wave. The first octant ranges from 0 degrees to 45 degrees in phase. Hence, the octant amplitude sample generator simultaneously generates both an in-phase component (i.e., sine) amplitude and a quadrature component (i.e., cosine) amplitude that correspond to the output of the XOR gate 414.

The octant symmetry controller 408 provides four outputs that provide for translation of the outputs of the octant amplitude sample generator 416 into amplitudes that correspond to the true octant of the phase signal. An invert output signal 410, INVERT, is supplied to the XOR gate 414 thus causing the state of the COARSE PHASE BITS 412 to be inverted. As alluded to with reference to FIG. 2, inverting the COARSE PHASE BITS 412 causes amplitudes to be selected within the sample generator 416 that represent phase angle offsets as reflected about a 45-degree axis. For example, a phase signal indicating a 50-degree phase angle, because 50 degrees is in a second sinusoidal octant, results in inversion of the COARSE PHASE BITS 412, thus causing generation of sine and cosine amplitudes corresponding to a 40-degree offset into the first octant. Similarly, SWAP 422, directs the muxes 424, 428, to exchange the cosine and sine outputs of the sample generator 416. NEGCOS 418 and NEGSIN 420 outputs are provided to negation logic 430 and 432, respectively. The function of NEGCOS 418 and NEGSIN 420 is to cause inversion of the COSINE output 434 and the SINE output 436.

Now referring to FIG. 5, diagram 500 is presented illustrating phase octant symmetries of sine and cosine waveforms according to the present invention. The diagram 500 shows a first octant of a cosine waveform 501 overlapping a first octant of a sine waveform 502. The first octant of the cosine waveform 501 depicts a first sample 503 and a last sample 504. The first octant of the sine waveform 502 also depicts a first sample 505 and a last sample 501. In all, there are 16 samples associated with each of the waveforms 501, 502. In practice, a digital frequency synthesizer according to the present invention will have hundreds of samples, however, for clarity of illustration, only 16 samples are shown for each waveform octant in FIG. 5. Amplitude samples for each of the waveforms are depicted with respect to an offset phase angle within the first octant.

The present invention exploits octant symmetry properties of sine and cosine waveforms to further compress the information that is required for generation of sinusoidal waveform amplitude samples. Thus, to produce amplitude samples corresponding to phase angles in a second octant for a cosine wave 501, inverted-index sine wave samples 502 are used. To produce amplitude samples corresponding to phase angles in a second octant for a sine wave 502, inverted-index cosine wave samples 501 are used. An amplitude sample corresponding to a phase angle within any of the eight phase octants can be generated by an octant sample generator according to the present invention by an appropriate combination of the following functions: inverting the state of coarse angle bits prior to providing them to the sample generator, negating sample values, and swapping sine 502 and cosine amplitudes 501.

Note that the first sine wave sample 505 is not set to zero. In fact, in the embodiment shown in FIG. 5, all of the amplitude samples corresponding to the sine and cosine octants 502, 501 are offset by an amplitude equal to one-half of the least significant bit of an index for the samples. By offsetting each of the amplitude samples in this manner, waveform distortion is obviated when the phase signal of a digital frequency synthesizer according to the present invention transitions from one octant to the next octant.

Now referring to FIG. 6, a diagram 600 is presented depicting phase signal bit assignments within a phase accumulator according to the present invention. The diagram 600 shows an N-bit phase signal 610 accumulator. The phase signal 610 has an octant field 611, comprising the three most significant bits; a coarse angle field 612, comprising W next most significant bits; and a fine angle field 613, comprising L next most significant bits. The diagram 600 also implies that lowest-order bits of the phase signal are truncated as has been previously discussed, however, one skilled in the art will appreciate that the overall phase signal width and constituent field widths are specified by a designer as a function of product type and application. In one embodiment, the phase signal 610 is 32 bits in width with a 7-bit coarse angle field 612 and a 3-bit fine angle field 613.

Operationally, the octant bits 611 are routed to an octant symmetry controller according to the present invention. The octant field 611 indicates a true octant associated with the phase angle offset that is indicated by the remaining bits in the phase angle signal 610. The coarse angle bits 612, routed to a coarse octant amplitude sample generator according to the present invention, indicate a coarse angle offset. When provided to the sample generator, the coarse angle bits 612 designate a specific pair of sine and cosine amplitude values for output.

The fine angle bits 613 indicate a fine angle associated with the phase signal 610. In the embodiment discussed with reference to FIG. 4, the fine angle bits 613 are not employed. However, other embodiments of the present invention include logic for improving the precision of the amplitude samples and this logic utilizes the fine angle bits 613. An example of an embodiment that utilizes the fine angle bits will be discussed with reference to FIG. 8.

Now referring to FIG. 7, a table 700 is presented depicting output states of an octant symmetry controller according to the present invention. Recall from the discussion with reference to FIG. 4 that the octant symmetry controller utilizes the octant bits of the phase signal to indicate a true octant. The four outputs of the octant symmetry controller (i.e., INVERT, NEGSIN, NEGCOS, and SWAP) direct logic within a digital frequency synthesizer according to the present invention to translate sine and cosine amplitude samples corresponding to a first octant, octant 0, into amplitude samples that correspond to the true octant.

Operationally, when bit states of a phase signal direct generation of a sine wave and a cosine wave within the first octant, none of the four outputs is asserted. This is because an octant-based amplitude sample generator according to the present invention generates amplitude samples corresponding to the first octant. There is no need to invert an index, negate an amplitude, or exchange sine and cosine samples.

When the phase signal directs generation of a sine wave and a cosine wave within the second octant, octant 1, the INVERT and SWAP outputs are asserted. This is because the indexes indicating angle offset must be inverted and sine and cosine amplitude values must be interchanged in the second octant in order to exploit the octant symmetry properties of the sinusoids.

The NEGSIN output is asserted during octants 4 through 7 because a sine wave's amplitude is negative during the second half of its cycle. Similarly, the NEGCOS output is asserted during octants 2 through 5 because these are the octants wherein a cosine wave's amplitude is negative.

Figure 8:
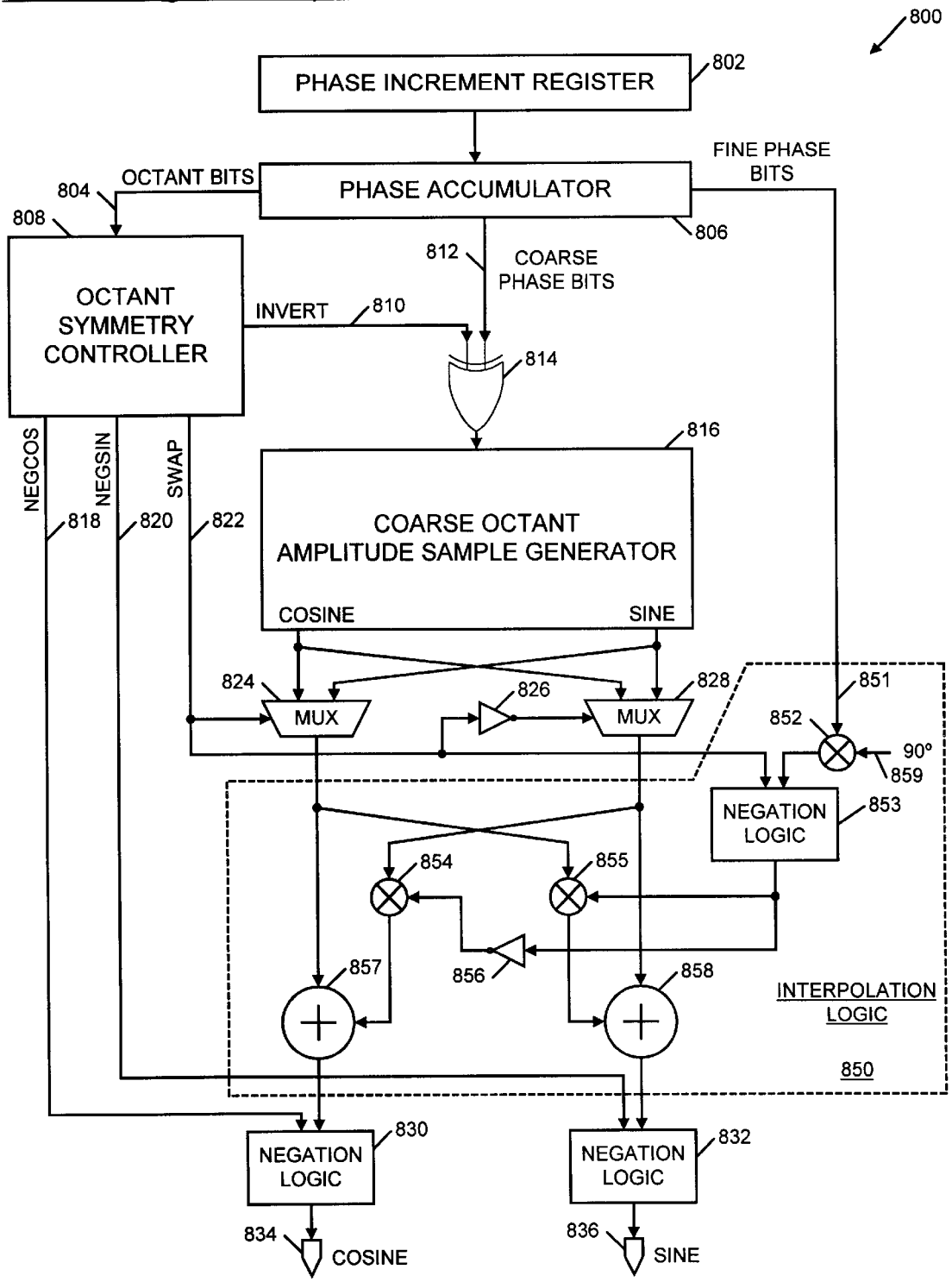
FIG. 8 is a block diagram of an octant-based direct digital frequency synthesizer according to the present invention featuring interpolation logic.

Now referring to FIG. 8, a block diagram is presented illustrating an octant-based direct digital frequency synthesizer 800 according to the present invention featuring interpolation logic 850. The digital frequency synthesizer 800 contains the same logic elements as like-numbered elements of the synthesizer 400 discussed with respect to FIG. 4, the hundreds digit being replaces with an 8. In addition, the digital frequency synthesizer 800 shown in FIG. 8 includes interpolation logic 850 for increasing the precision of amplitude samples generated by the amplitude sample generator 816.

The interpolation logic 850 includes a scaling multiplier 852 that receives a fine phase angle input 851 from the phase signal generated by the phase accumulator. The output of the scaling multiplier 852 is provided to negation logic 853. The interpolation logic 850 also has a first term multiplier 854 for the cosine leg of the synthesizer 800 and a first term multiplier 855 for the sine leg of the synthesizer 800. The output of the negation logic 853 is inverted by inverter 856 and is provided to the cosine leg multiplier 854. In addition, the interpolation logic has a cosine leg adder 857 connected between mux 824 and negation logic 830 and a sine leg adder 858 connected between mux 828 and negation logic 832.

In operation, the interpolation logic 850 employs the Taylor Series compression technique to improve the precision of amplitude samples generated by the sample generator 816. Recall from the discussion with reference to FIG. 2 that the first term in a Taylor Series expansion is the value of the a function at the last computed point, corresponding in this example to the sine and cosine amplitudes generated using the coarse angle bits 812. The second Taylor Series expansion term is the first derivative of the function multiplied by the difference between the last computed point and a new point, the difference component corresponding in this example to the value indicated by the fine angle bits 851.

The advantage the present invention affords to the application a Taylor series technique to improve the precision of amplitude samples results from the fact that derivatives of sinusoidal functions are sinusoidal functions. More specifically, the first derivative of a sine wave is a cosine wave and the first derivative of a cosine wave is a negative sine wave. Furthermore, since amplitude values for both sine and cosine waves are already generated by the sample generator 816, only simple logic elements 852–858 are required to manipulate the samples for utilization by a Taylor Series compression technique, thus providing improved precision of output waveforms without necessitating the addition of complex circuits.

For phase angles lying within the first octant, the adders 857, 858 sum generated amplitude samples with samples of their corresponding derivative waveforms multiplied by the fine phase angle 851. But prior to multiplication, the fine phase bits 851 must be multiplied by a 90-degree term 859 to account for digital scaling difference between amplitude magnitude representations phase magnitude representations within the synthesizer circuit 800.

For phase angles lying within octants other than the first octant, the generated Taylor series terms are manipulated so that they correspond correctly with amplitude samples swapped by the muxes 824, 828. Hence, the SWAP output 822 of the symmetry controller 808 is provided to the negation logic 853 to change the sign of the derivative terms during those octants that swapping of sine and cosine amplitude samples is required.

The benefit of coarse octant amplitude sample generation is rooted in the fact that both in-phase and quadrature samples are simultaneously provided by the sample generator 816. Hence, in addition to supporting quadrature modulation schemes, output precision is vastly improved by the addition of a few simple logic gates 852–858.

Figure 9:
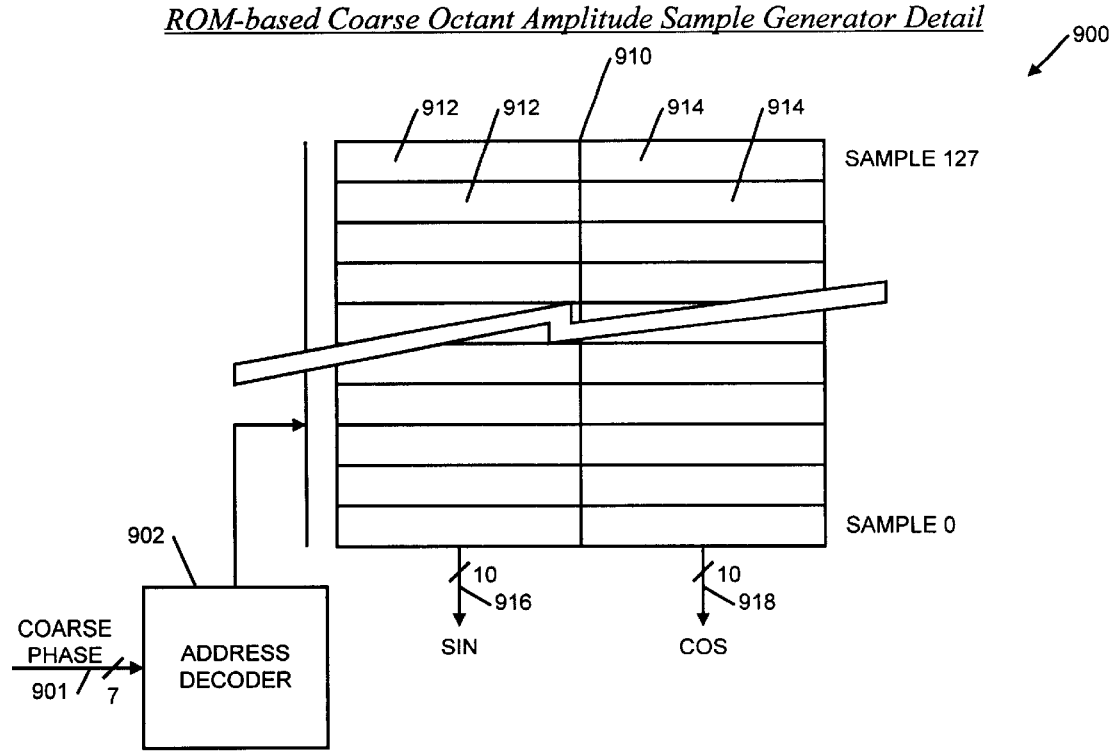
FIG. 9 is a block diagram of a ROM-based coarse octant amplitude sample generator according to the present invention.

Now referring to FIG. 9, a block diagram is presented of one embodiment of a ROM-based coarse octant amplitude sample generator 900 according to the present invention. The generator 900 has a 7-bit coarse phase input 901 that is supplied to an address decoder 902. The address decoder provides an index into a memory array 910. The memory array contains multiple paired sine amplitude locations 912 and cosine amplitude locations 914. 10-bit Sine amplitude samples are output via a sine output 916 and 10-bit cosine amplitude samples are output via a cosine output 918. While bit sizes are shown for both input 901 and outputs 916, 918, such parameters are typically specified for a specific digital frequency synthesis application based upon a number of extemporaneous requirements. One skilled in the art will appreciate that the input 901 and output 916, 918 widths are representative for use in a typical application.

Operationally, the coarse phase bits 901 are provided by a phase accumulator according to the present invention and are decoded by the address decoder 902 to index into the memory array 910. A specific index selects a pair of sine 912 and cosine 914 locations corresponding to a coarse phase angle offset. The amplitudes are routed respectively to the sine output 916 and the cosine output 918. Recall that angle reflection is provided for by a symmetry controller by inverting the coarse phase bits 901 prior to their presentation to the address decoder 902. The power, cost, and complexity benefits of the present invention are represented by the logic shown in FIG. 9. Whereas the octant-based scheme stores the same number of amplitude samples as a quadrant-based scheme, since sine and cosine amplitudes are paired in the octant-based scheme, roughly only half the number of decoding logic cells are required.

Figure 10:
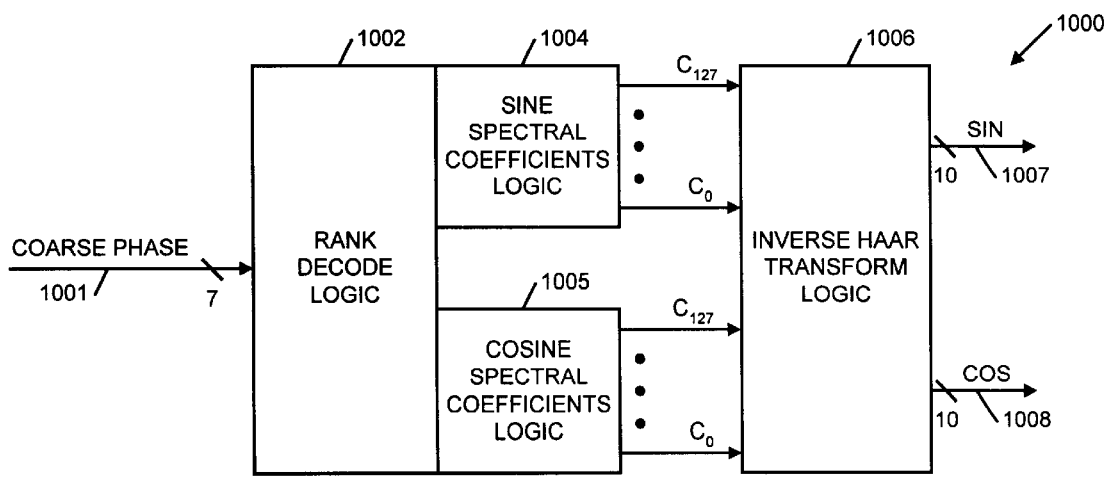
FIG. 10 is a block diagram of a Haar Transform-based coarse octant amplitude sample generator according to the present invention.

Now referring to FIG. 10, a block diagram is presented of a Haar Transform-based coarse octant amplitude sample generator 1000 according to the present invention. The Haar Transform-based coarse octant amplitude sample generator 1000 receives a 7-bit coarse phase input 1001 like the ROM-based amplitude sample generator 900 discussed previously. The Haar Transform-based coarse octant amplitude sample generator 1000 contains rank decode logic 1002 that is coupled to both sine spectral coefficients generation logic 1004 and cosine spectral coefficients generation logic 1005. The coefficients generated by the sine spectral coefficients generation logic 1004 and cosine spectral coefficients generation logic 1005 are provided to inverse Haar Transform logic 1006. Generated 10-bit sine amplitudes and 10-bit cosine amplitudes corresponding to the coarse phase signal 1001 are provided via a sin output 1007, SIN, and cosine output 1008.

Rather than employing a storage technology such as a ROM to store octant amplitude samples, the present inventor has observed that some waveforms, in particular sinusoidal waveforms, lend themselves to more efficient encoding when expressed in domains other than phase versus amplitude, as in the case of ROM-based storage. The Haar Transform is a discrete functional transform that relates an original system of functions to a series of coefficients-very much like the Fast Fourier Transform (FFT) that is well known in the art. In fact, like the FFT, generation of the Haar spectral coefficients for a given function involves the same type of "butterfly" operations that characterize the FFT. There are however, three major advantages that utilization of the Haar Transform holds over conventional FFT techniques: 1) the Haar Transform preserves information related to the original domain, in this case, the phase domain; 2) the butterfly operations to effect a Haar transform are additions and subtractions on real numbers whereas FFT-like transforms additionally involve multiplications on complex numbers; and 3) Haar coefficients corresponding to sinusoidal waveforms can be stored in approximately one-quarter of the space required to store equivalent amplitude samples. Thus, by employing Haar Transforms to map a given coarse angle to corresponding sine and cosine amplitude samples results in roughly a 4-to-1 savings in logic cell space and commensurate power.

A complete discussion of Haar Transform theory can be found in *Finite Orthogonal Series in the Design of Digital Devices*, M. G. Karpovsky, 1976, John Wiley & Sons, Inc.: New York, ISBN 0-470-15015-7; which is hereby incorporated by reference. An additional discussion of Haar Transform logic is provided in co-pending U.S. patent application Ser. No. 09/390,899 entitled *Apparatus and Method for Compact Haar Transform*, filed on the same day as this application.

Thus, for a Haar Transform-based amplitude sample generator 1000; amplitude samples are not actually stored in a memory structure; they are generated, first by computing Haar coefficients corresponding to a supplied phase angle and then by transforming these coefficients into amplitude samples.

Figure 11:
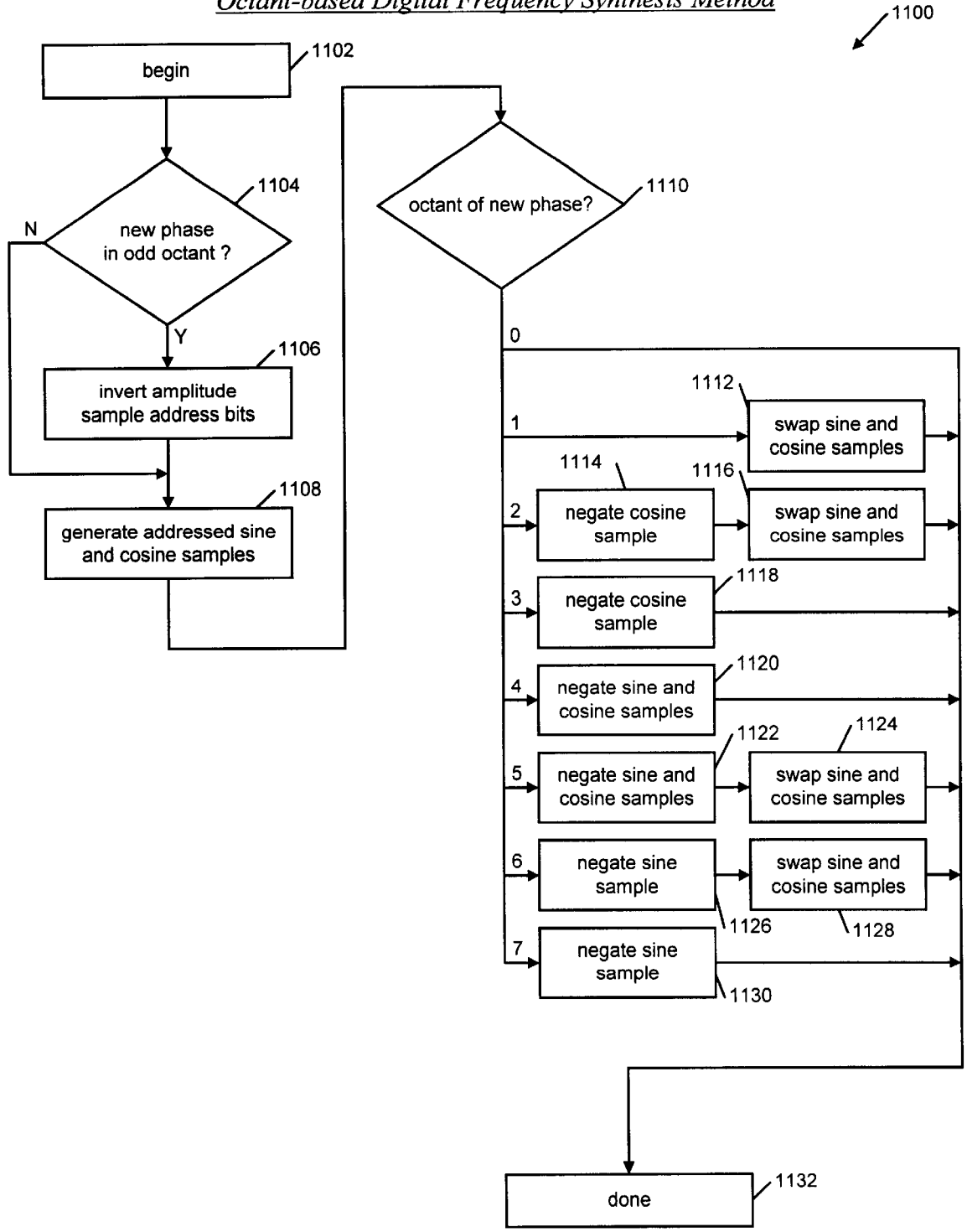
FIG. 11 is a flow chart illustrating a method for octant-based direct digital frequency synthesis according to the present invention.

Now referring to FIG. 11, a flow chart is presented illustrating a method for octant-based direct digital frequency synthesis according to the present invention.

The method begins at block 1102 where a coarse phase signal is produced by a phase accumulator according to the present invention for generation of both a corresponding sine wave amplitude sample and a corresponding cosine wave amplitude sample. Flow then proceeds to decision block 1104.

At decision block 1104, octant bits of the coarse phase signal are evaluated to determine if the coarse angle lies within an odd-numbered phase octant, where the first octant of a sinusoidal waveform is numbered octant 0 and the eighth octant is numbered octant 7. If the coarse angle lies within an even-numbered octant, then flow proceeds to block 1108. If the coarse angle lies within an odd-numbered octant, then flow proceeds to block 1106.

At block 1106, because the coarse phase angle lies within an odd-numbered octant, it is necessary to manipulate the indicated coarse angle offset into an octant-base amplitude sample generator according the present invention so that it indicates an offset from 45 degrees rather than an offset from 0 degrees. This is accomplished by inverting the bit states of the coarse angle address bits. Flow then proceeds to block 1108.

At block 1108, the coarse angle address bits (or an inverted state form of the bits) are supplied to the octant-based amplitude sample generator. In accordance with the angle offset, both a sine amplitude sample and a cosine amplitude sample are generated by the sample generator. Both amplitude samples correspond to angles within octant 0 of a sinusoidal waveform. Flow then proceeds to decision block 1110.

At decision block 1110, octant bits of the phase signal are again evaluated to determine the true octant to which the generated amplitude samples apply. If the true octant is octant 0, then flow proceeds to block 1132. If the true octant is octant 1, then flow proceeds to block 1112. If the true octant is octant 2, then flow proceeds to block 1114. If the true octant is octant 3, then flow proceeds to block 1118. If the true octant is octant 4, then flow proceeds to block 1120. If the true octant is octant 5, then flow proceeds to block 1122. If the true octant is octant 6, then flow proceeds to block 1126. If the true octant is octant 7, then flow proceeds to block 1130.

At block 1112, because octant 1 is the indicated true octant corresponding to the phase signal, the generated sine and cosine amplitude samples are swapped. Flow then proceeds to block 1132.

At block 1114, because octant 2 is the indicated true octant corresponding to the phase signal, the cosine sample is negated. Flow then proceeds to block 1116.

At block 1116, the generated sine and negated cosine amplitude samples are swapped. Flow then proceeds to block 1132.

At block 1118, because octant 3 is the indicated true octant corresponding to the phase signal, the generated cosine amplitude sample is negated. Flow then proceeds to block 1132.

At block 1120, because octant 4 is the indicated true octant corresponding to the phase signal, the both the generated sine and cosine amplitude samples are negated. Flow then proceeds to block 1132.

At block 1122, because octant 5 is the indicated true octant corresponding to the phase signal, the both the generated sine and cosine amplitude samples are negated. Flow then proceeds to block 1124.

At block 1124, the negated sine and negated cosine amplitude samples are swapped. Flow then proceeds to block 1132.

At block 1126, because octant 6 is the indicated true octant corresponding to the phase signal, only the generated sine amplitude sample is negated. Flow then proceeds to block 1128.

At block 1128, the negated sine and generated cosine amplitude samples are swapped. Flow then proceeds to block 1132.

At block 1130, because octant 7 is the indicated true octant corresponding to the phase signal, only the generated sine amplitude sample is negated. Flow then proceeds to block 1132.

At block 1132, the method completes.

Although the present invention and its objects, features, and advantages have been described in detail, other embodiments are encompassed by the invention. For example, one skilled in the art will appreciate that the present invention described above may be embodied as computer instructions stored within a computer readable medium. Such an embodiment may be in the form of VHSIC Hardware Description Language (VHDL), Verilog, or a behavioral model such as RTL, stored on a hard disk, or other permanent medium that is readable by a computer. When executed, the instructions cause the computer to completely describe the direct digital frequency synthesizer according to the present invention such that it can be simulated, tested, modified, or fabricated, either as a stand-alone circuit or as a circuit incorporated into a more complex design.

In addition, the present invention has been particularly characterized in terms of a digital frequency synthesizer having simultaneous outputs for both an in-phase amplitude and a quadrature amplitude. But employment of the present invention is not restricted to such applications that require both outputs. Indeed, the an embodiment of the present invention can be provided consisting of either an in-phase component output or a quadrature component output.

Furthermore, although an embodiment of the present invention has been detailed that utilizes only one derivative term of a Taylor series expansion to improve the spectral purity of its outputs, one skilled in the art will appreciate that, since higher order derivatives of sinusoids are also sinusoid, embodiments of the present invention that utilize higher-order Taylor series expansion terms are also realizable without the requirement to generate additional amplitudes; only simple multipliers and adders are needed to utilize these higher-order terms.

Also, the present invention has been specifically discussed with reference to communications and modulation applications areas. Such application areas are well known and easily understood, however, application of the present invention extends to direct digital frequency synthesis circuits used in other application areas as well, to include audio synthesis, geologic waveform synthesis, radar waveform generation, and waveforms applicable to the medical sciences. Such waveforms may not be sinusoidal, yet, having octant symmetry properties, they can be generated by embodiments of the present invention.

Moreover, future advances in the modulation arts may result in the use of other waveform components in addition to in-phase and quadrature components to accomplish modulation, such as an octature component (one that is offset from the in-phase component by 45 degrees). Or perhaps modulation schemes will be developed that utilize more than two variants of a prescribed frequency sinusoidal waveform. The present invention comprehends such improvements. An octant-based amplitude sample generator can easily be extended to encompass more waveform variants without requiring more sample locations or the sample generator can be made to generate phase-shifted components.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A frequency synthesizer for producing a sinusoidal waveform, comprising:
   a phase signal, configured to indicate a desired phase angle of the sinusoidal waveform; and
   a phase-to-amplitude converter, coupled to said phase signal, configured to provide a desired amplitude sample corresponding to said desired phase angle, wherein said desired amplitude sample is derived from amplitude samples corresponding to an octant of the sinusoidal waveform, said phase-to-amplitude converter comprising:
      a Haar Transform-based coarse octant amplitude sample generator, configured to compute Haar coefficients corresponding to said phase signal, and configured to transform said Haar coefficients into said desired amplitude sample.

2. The frequency synthesizer as recited in claim 1, wherein said desired phase angle is within one of eight 45-degree phase octants of the sinusoidal waveform.

3. The frequency synthesizer as recited in claim 2, wherein said phase signal is provided by a phase accumulator.

4. The frequency synthesizer as recited in claim 3, wherein the sinusoidal waveform comprises a sine wave.

5. The frequency synthesizer as recited in claim 3, wherein the sinusoidal waveform comprises a cosine wave.

6. The frequency synthesizer as recited in claim 3, wherein said Haar coefficients comprise compact Haar transform coefficients.

7. The frequency synthesizer as recited in claim 6, wherein said Haar Transform-based coarse octant amplitude sample generator comprises:
   inverse Haar transform logic, configured to transform said Haar coefficients into said desired amplitude sample.

8. The frequency synthesizer as recited in claim 7, wherein said Haar-Transform-based coarse octant amplitude sample generator further comprises:
   spectral coefficients logic, configured to compute said Haar coefficients corresponding to said phase signal.

9. The frequency synthesizer as recited in claim 8, wherein said Haar Transform-based coarse octant amplitude sample generator further comprises:
   rank decode logic, for selecting said Haar coefficients corresponding to said phase signal.

10. The frequency synthesizer as recited in claim 9, wherein said amplitude samples comprise an in-phase component sample and a quadrature component sample.

11. The frequency synthesizer as recited in claim 3, further comprising:
   interpolation logic, coupled to said symmetry controller, configured to add a first-order Taylor series term to said desired amplitude sample, thereby increasing the precision of the sinusoidal waveform, wherein said interpolation logic comprises:

a multiplier, configured to multiply fine phase bits of said phase signal by a 90 degree term to account for digital scaling difference between amplitude magnitude representations and phase magnitude representations within the frequency synthesizer.

12. A digital frequency synthesizer for simultaneously producing a sine wave and a cosine wave, the sine wave and the cosine wave being at a prescribed frequency, the digital frequency synthesizer comprising:

an amplitude sample generator, configured to compute Haar coefficients corresponding to a desired phase angle, and configured to transform said Haar coefficients into a particular in-phase amplitude sample and a particular quadrature amplitude sample, and configured to generate amplitude samples that lie within a first phase octant ranging from 0 degrees to 45 degrees, said amplitude sample generator comprising:

in-phase amplitude samples, for indicating sine wave amplitudes within said first phase octant;

quadrature amplitude samples, for indicating cosine wave amplitudes within said first phase octant; and a symmetry controller, coupled to said amplitude sample generator, for receiving a phase signal from a phase accumulator, said phase signal indicating said desired phase angle, and for selecting said particular in-phase amplitude sample and said particular quadrature amplitude sample to provide a desired sine wave amplitude and a desired cosine wave amplitude at said desired phase angle; and interpolation logic, coupled to said symmetry controller, configured to add a first first-order Taylor series term to said particular in-phase amplitude sample, thereby increasing precision of the sine wave, said interpolation logic comprising:

a multiplier, configured to multiply fine phase bits of said phase signal by a 90 degree term to account for digital scaling difference between amplitude magnitude representations and phase magnitude representations within the frequency synthesizer.

13. The digital frequency synthesizer as recited in claim 12, wherein said Haar coefficients comprise compact Haar transform coefficients.

14. A computer program product for use in designing, simulating, fabricating, or testing a direct digital frequency synthesizer circuit, the computer program product comprising:

a storage medium, having computer readable instructions embodied thereon, for causing a computer upon which said computer readable instructions are executed to describe the digital frequency synthesizer circuit such that it can be modified, simulated, fabricated, or tested, said computer readable instructions comprising:

first instructions, for causing said computer to describe a phase signal, for indicating a desired phase angle of a sinusoidal waveform; and second instructions, for causing said computer to describe a phase-to-amplitude converter, coupled to said phase signal, for providing a desired amplitude sample corresponding to said desired phase angle, wherein said desired amplitude sample is derived from amplitude samples corresponding to an octant of said sinusoidal waveform, wherein said phase-to-amplitude converter comprises:

a Haar Transform-based coarse octant amplitude sample generator, configured to compute Haar coefficients corresponding to said phase signal, and configured to transform said Haar coefficients into said desired amplitude sample.

15. The computer program product as recited in claim 14, wherein said Haar coefficients comprise compact Haar transform coefficients.

16. The computer program product as recited in claim 14, wherein said Haar Transform-based coarse octant amplitude sample generator comprises:

inverse Haar transform logic, configured to transform said Haar coefficients into said desired amplitude sample.

17. The computer program product as recited in claim 14, further comprising:

third instructions, for causing said computer to describe interpolation logic, for adding a first-order Taylor series term to said specific in-phase amplitude sample, said interpolation logic comprising:

a multiplier, configured to multiply fine phase bits of said phase signal by a 90 degree term to account for digital scaling difference between amplitude magnitude representations and phase magnitude representations within the digital frequency synthesizer circuit.

18. A method for generating a sine wave and a cosine wave at a prescribed frequency by direct digital frequency synthesis, the method comprising:

providing a phase angle signal, wherein the rate of change of the phase angle signal corresponds to the prescribed frequency;

generating Haar coefficients that correspond to a first octant of the sine wave and the cosine wave;

selecting specific Haar coefficients that correspond to a specific phase offset within the first octant, wherein a desired phase angle for the sine wave and the cosine wave is determined by summing a true octant base angle with the specific phase offset; and translating the specific Haar coefficients into a cosine amplitude sample and a sine amplitude sample that correspond to the desired phase angle.

19. The method as recited in claim 18, further comprising:

adding a first-order Taylor series term to the cosine amplitude sample and the sine amplitude sample to increase the precision of the sine wave and the cosine wave, wherein said adding comprises:

multiplying fine phase bits of the desired phase angle by a 90 degree term to account for digital scaling difference between amplitude magnitude representations and phase magnitude representations within a digital frequency synthesizer circuit.

20. The method as recited in claim 18, wherein said generating comprises:

employing a compact Haar transform to produce the Haar coefficients.

* * * * *